United States Patent
Kim et al.

(10) Patent No.: US 11,495,037 B2
(45) Date of Patent: Nov. 8, 2022

(54) ARTIFICIAL INTELLIGENCE PROCESSOR AND METHOD OF PERFORMING NEURAL NETWORK OPERATION THEREOF

(71) Applicant: SAMSUNG ELECTRONICS CO., LTD., Suwon-si (KR)

(72) Inventors: Doohyun Kim, Suwon-si (KR); Minyong Sung, Suwon-si (KR); Taejun Park, Suwon-si (KR); Sangjo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 153 days.

(21) Appl. No.: 16/892,357

(22) Filed: Jun. 4, 2020

(65) Prior Publication Data
US 2021/0004653 A1 Jan. 7, 2021

(30) Foreign Application Priority Data
Jul. 5, 2019 (KR) .................. 10-2019-0081524

(51) Int. Cl.
*G06V 30/194* (2022.01)
*G06N 3/04* (2006.01)
*G06N 3/08* (2006.01)

(52) U.S. Cl.
CPC ......... *G06V 30/194* (2022.01); *G06N 3/0454* (2013.01); *G06N 3/08* (2013.01)

(58) Field of Classification Search
CPC ...... G06V 30/194; G06N 3/0454; G06N 3/08; G06N 3/0481; G06N 3/063; Y02D 10/00; G06F 2212/1028; G06F 12/0207; H04N 19/59
See application file for complete search history.

(56) References Cited

U.S. PATENT DOCUMENTS 10,063,808 B2 8/2018 Lee et al.
10,225,607 B1 3/2019 Bai et al.
(Continued)

FOREIGN PATENT DOCUMENTS

EP 3 709 224 9/2020
GB 2548749 9/2017
(Continued)

OTHER PUBLICATIONS

Extended Search Report and Written Opinion dated Dec. 23, 2020 in counterpart European Patent Application No. 20182359.8.
(Continued)

*Primary Examiner* — Diane D Mizrahi
(74) *Attorney, Agent, or Firm* — Nixon & Vanderhye P.C.

(57) ABSTRACT

An artificial intelligence (AI) processor includes at least one memory; a plurality of neural network operators comprising circuitry configured to process an image; and a controller configured to control the at least one memory and the plurality of neural network operators. The controller controls input image data of an image to be stored in the at least one memory and controls at least one of the plurality of neural network operators to perform a neural network operation on image data split based on a size of the image and data processing capabilities of the plurality of neural network operators, and output upscaled image data.

20 Claims, 12 Drawing Sheets

(56) References Cited

U.S. PATENT DOCUMENTS

| | | | |
|---|---|---|---|
| 2009/0175548 A1* | 7/2009 | Fukuhara | H04N 19/63 |
| | | | 382/248 |
| 2014/0314141 A1* | 10/2014 | Choi | H04N 19/463 |
| | | | 375/240.02 |
| 2015/0106306 A1* | 4/2015 | Birdwell | G06N 3/0635 |
| | | | 706/11 |
| 2017/0103040 A1 | 4/2017 | Henry et al. | |
| 2018/0005074 A1 | 1/2018 | Shacham et al. | |
| 2018/0130178 A1 | 5/2018 | Wang et al. | |
| 2018/0341495 A1 | 11/2018 | Culurciello et al. | |
| 2019/0230354 A1 | 7/2019 | Kim | |
| 2020/0389658 A1 | 12/2020 | Kim et al. | |

FOREIGN PATENT DOCUMENTS

| | | |
|---|---|---|
| KR | 10-2018-0100976 | 9/2018 |
| KR | 10-1974261 | 4/2019 |
| WO | 2018/154092 | 8/2018 |
| WO | 2018/189613 | 10/2018 |
| WO | 2019/009490 | 1/2019 |
| WO | 2019/085655 | 5/2019 |

OTHER PUBLICATIONS

Farabet, Clement et al., "Hardware accelerated convolutional neural networks for synthetic vision systems," IEEE International Symposium on Circuits and Systems, ISCAS 2010—May 30-Jun. 2, 2010, Paris, France, May 1, 2010, pp. 257-260.

International Search Report and Written Opinion dated Sep. 11, 2020 in corresponding International Application No. PCT/KR2020/007185.

European Examination Report dated May 31, 2022 for EP Application No. 20182359.8.

* cited by examiner

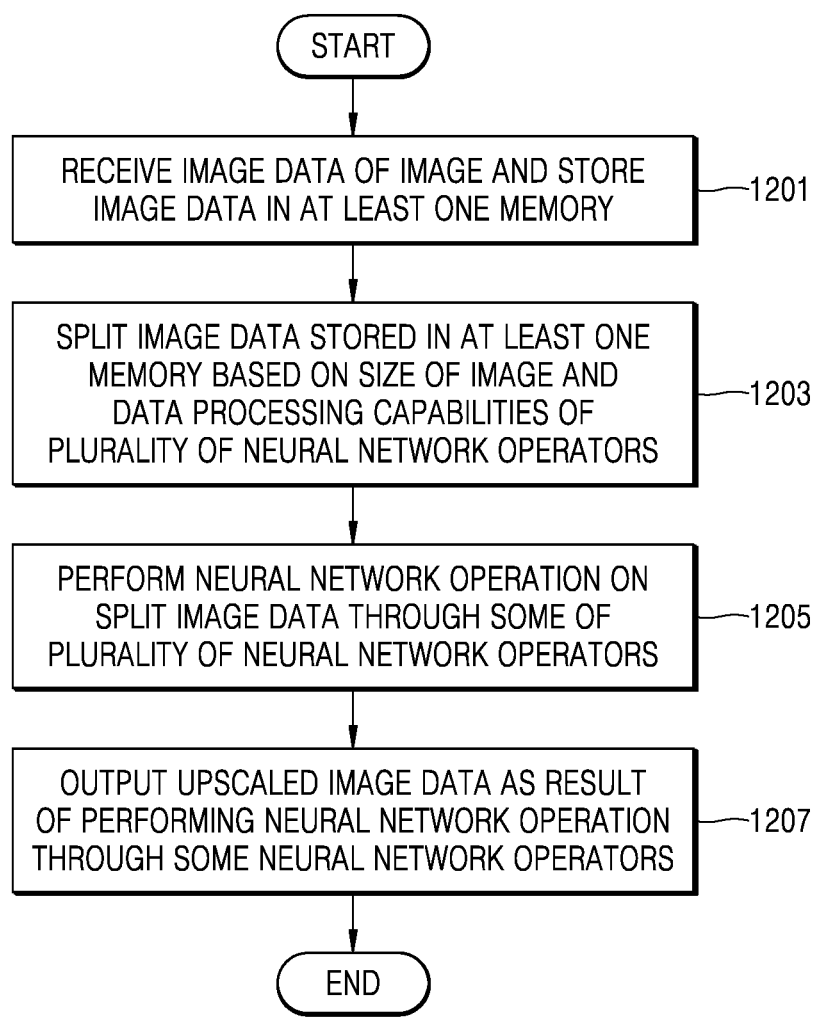

ND METHOD OF PERFORMING NEURAL
ARTIFICIAL INTELLIGENCE PROCESSOR AND METHOD OF PERFORMING NEURAL NETWORK OPERATION THEREOF

CROSS-REFERENCE TO RELATED APPLICATION

This application is based on and claims priority under 35 U.S.C. § 119 to Korean Patent Application No. 10-2019-0081524, filed on Jul. 5, 2019, in the Korean Intellectual Property Office, the disclosure of which is incorporated by reference herein in its entirety.

BACKGROUND

1. Field

The disclosure relates to image processing, and for example, to an artificial intelligence (AI) processor for performing image processing and image processing using the AI processor.

2. Description of Related Art

Because of the increased interest in artificial intelligence (AI) technology, attempts have been made to apply the AI technology to products such as terminal devices such as televisions (TVs) and smart phones in an embedded manner and operate the products in an on-device environment.

In particular, the AI technology has been widely applied to image processing, and technology for performing image processing using an artificial neural network having a multilayer structure has been continuously developed. For example, technologies for performing various image processing operations have been developed, such as improving image quality, enlarging the size of an image, or predicting and reconstructing an area missing from an image, using an artificial neural network.

When an artificial neural network is used in an image processing field, a large amount of computation is required for image processing using the artificial neural network. In particular, when the size of an image gradually increases or the image needs to be processed in real time, resource and power consumption of hardware for processing the image may further increase. In addition, when image processing is performed in an on-device environment of a terminal device other than a server, technology for reducing the resource and the power consumption of hardware of the terminal device becomes more important.

SUMMARY

Embodiments of the disclosure provide an artificial intelligence (AI) processor and a method of performing a neural network operation thereof to reduce resource or power consumption of hardware of a terminal device required for image processing.

In addition, embodiments of the disclosure provide an AI processor capable of adaptively operating with respect to various image sizes, a method of performing a neural network operation, and a neural network operation platform.

Additional aspects will be set forth in part in the description which follows and, in part, will be apparent from the description.

According to an example embodiment of the disclosure, an artificial intelligence (AI) processor includes: at least one memory; a plurality of neural network operators comprising circuitry configured to process an image; and a controller comprising circuitry configured to control the at least one memory and the plurality of neural network operators. The controller may be configured to control input image data to be stored in the at least one memory and to control at least one of the plurality of neural network operators to perform a neural network operation on image data split based on a size of the image and data processing capabilities of the plurality of neural network operators and output upscaled image data.

According to another example embodiment of the disclosure, a method, performed by an AI processor, of performing a neural network operation includes: receiving image data of an image, storing the image data in at least one memory; splitting the image data stored in the at least one memory based on a size of the image and data processing capabilities of a plurality of neural network operators; performing the neural network operation on the split image data through at least one of the plurality of neural network operators; and outputting upscaled image data as a result of performing the neural network operation through the some neural network operators.

BRIEF DESCRIPTION OF THE DRAWINGS

The above and other aspects, features, and advantages of certain embodiments of the disclosure will be more apparent from the following detailed description, taken in conjunction with the accompanying drawings, in which:

FIG. 12 is a flowchart illustrating an example method, performed by an AI processor, of performing a neural network operation, according to an embodiment of the disclosure.

DETAILED DESCRIPTION

Figure 1:
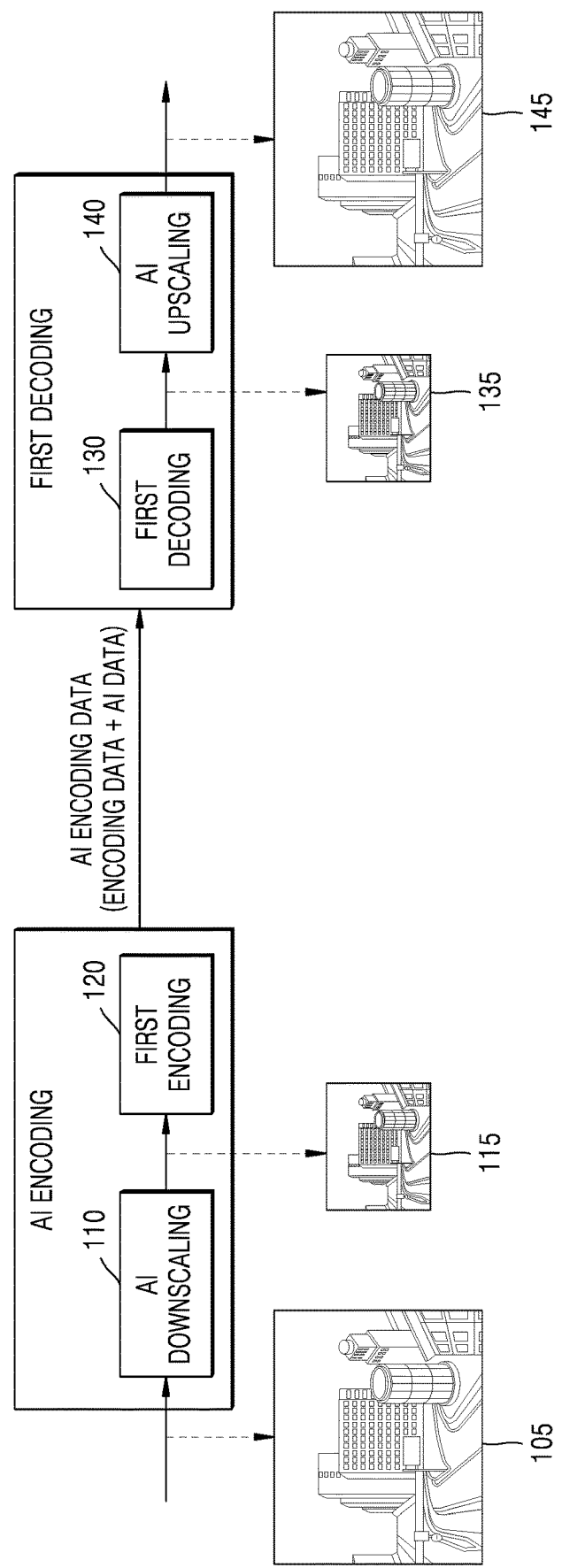
FIG. 1 is a diagram illustrating an example artificial intelligence (AI) encoding process and an example AI decoding process, according to an embodiment of the disclosure.

The disclosure allows for various changes and numerous example embodiments of the disclosure. Various example embodiments of the disclosure will be illustrated in the drawings and described in greater detail below. However, this is not intended to limit the disclosure to any particular embodiment of the disclosure, and it is to be appreciated that all changes, equivalents, and substitutes that do not depart from the spirit and technical scope of the disclosure are encompassed in the disclosure.

In the disclosure, certain detailed explanations of the related art may be omitted when it is deemed that they may unnecessarily obscure the essence of the disclosure. In addition, numbers (e.g., first, second, etc.) used in the description of the disclosure are merely identification symbols for distinguishing one component from another component.

In addition, when it is mentioned that one component is "connected" or "coupled" to another component herein, although the one component may be directly connected or directly coupled to the other component, it is to be understood that unless otherwise specifically described, the one component may be connected or coupled to the other component via another component therebetween.

In addition, with regard to components represented by '~ er/or (unit)', 'module', etc. herein, two or more components may be combined into one component or one component may be divided into two or more components for each subdivided function. In addition, each component to be described below may additionally perform some or all of functions of other components in addition to main functions of each component, and some of the main functions of each component may be performed by the other components.

Throughout the disclosure, the expression "at least one of a, b or c" indicates only a, only b, only c, both a and b, both a and c, both b and c, all of a, b, and c, or variations thereof.

In addition, in the disclosure, an 'image' may, for example, and without limitation, represent a still image (or an image frame) of a video, a moving image including a plurality of continuous still images, a video, etc.

FIG. 1 is a diagram illustrating an example artificial intelligence (AI) encoding process and an AI decoding process according to an embodiment of the disclosure.

As shown in FIG. 1, according to an embodiment of the disclosure, an original image 105 (e.g., an 8K image) of a high resolution may be AI downscaled 110 and a first image 115 (e.g., a 4K image) may be generated. In this example, because the first encoding 120 and the first decoding 130 are performed on the first image 115 of a relatively low resolution, a processed bit rate may be greatly reduced compared to a case where the first encoding 120 and the first decoding 130 are performed on the original image 105.

In the AI encoding process of FIG. 1, the original image 105 may be AI downscaled 110 to generate the first image 115 and the first encoding 120 is performed on the generated first image 115. In an AI decoding process, AI encoding data including AI data generated as a result of AI encoding and image data may be received, and a second image 135 (e.g., a 4K image) may be generated through the first decoding 130 and may be AI upscaled 140 and a third image 145 (e.g., an 8K image) may be generated.

For example, with regard to the AI encoding process, when the original image 105 is received, the original image 105 may be AI downscaled 110 to generate the first image 115 of a predetermined resolution or a predetermined image quality. The AI downscaling 110 may be performed on an AI basis, and AI for the AI downscaling 110 may be trained connectively with AI for the AI upscaling 140 of the second image 135. This is because a difference between the original image 105 that is an AI encoding target and the third image 145 reconstructed through AI decoding increases when the AI for the AI downscaling 110 and the AI for the AI upscaling 140 may be trained separately.

In order to maintain such a connection relationship between the AI encoding process and the AI decoding process, AI data may be used. The AI data generated through the AI encoding process may include information representing an upscale target. In this example, the second image 135 may be AI upscaled 140 according to the upscale target confirmed based on the AI data in the AI decoding process.

The AI for the AI downscaling 110 and the AI for the AI upscaling 140 may be implemented in a neural network model (e.g., a deep neural network (DNN)). Because a neural network model used for the AI downscaling 110 and a neural network model used for the AI upscaling 140 are trained connectively through sharing of loss information under a predetermined target, an AI encoding device may provide target information used during connection training, and an AI decoding device may AI upscale 140 the second image 135 to a targeted resolution based on the provided target information.

For example, with regard to the first encoding 120 and the first decoding 130 of FIG. 1, an amount of information of the first image 115 that is AI downscaled 110 from the original image 105 may be reduced through the first encoding 120. The first encoding 120 may include processes of predicting the first image 115 to generate prediction data, generating residual data corresponding to a difference between the first image 115 and the prediction data, transforming the residual data that is a spatial domain component into a frequency domain component, quantizing the residual data transformed into the frequency domain component, entropy encoding the quantized residual data, etc. The first encoding 120 may be implemented through an of various image compression methods using a frequency transformation such as, for example, and without limitation, MPEG-2, H.264, Advanced Video Coding (AVC), MPEG-4, High Efficiency Video Coding (HEVC), VC-1, VP8, VP9 and AOMedia Video 1 (AV1), etc.

The second image 135 corresponding to the first image 115 may be reconstructed through the first decoding 130 of the image data. The first decoding 130 may include, for example, and without limitation, processes of entropy decoding the image data to generate the quantized residual data, dequantizing the quantized residual data, transforming the residual data of the frequency domain component to the spatial domain component, generating the prediction data, reconstructing the first image 135 using the prediction data and the residual data, etc. The first decoding 130 may be implemented through an image reconstruction method corresponding to any image compression method using the frequency transformation such as, for example, and without limitation, MPEG-2, H.264, MPEG-4, HEVC, VC-1, VP8, VP9, AV1, etc.

The AI encoding data generated through the AI encoding process may include encoding data generated as a result of the first encoding 120 of the first image 115 and AI data related to the AI downscaling 110 of the original image 105.

The encoding data may be used in the first decoding 130, and the AI data may be used in the AI upscaling 140.

The encoding data may, for example, be transmitted in the form of a bitstream. The encoding data may include data generated based on pixel values in the first image 115, for example, the residual data that is a difference between the first image 115 and the prediction data of the first image 115. In addition, the encoding data may include information used in the first encoding 120 of the first image 115. For example, the encoding data may include mode information (e.g., prediction mode information, motion information, etc.) used for the first encoding 120 of the first image 115, and quantization parameter related information used in the first encoding 120, etc. The encoding data may be generated according to a rule, for example, syntax, of an image compression method used in the first encoding 120 among the image compression methods using the frequency transformation such as, for example, and without limitation, MPEG-2, H.264 AVC, MPEG-4, HEVC, VC-1, VP8, VP9, AV1, etc.

The AI data may be used for the AI upscaling 140 based on a neural network operation. As described above, because a neural network model used for the AI downscaling 110 and a neural network model used for the AI upscaling 140 are trained connectively, the AI data may include information for accurately enabling the AI upscaling 140 of the second image 135. In the AI decoding process, the second image 135 may be AI upscaled 140 to a targeted resolution or image quality based on the AI data. The AI data may be transmitted together with the encoding data in the form of a bitstream. According to an implementation example, the AI data may be transmitted separately from the encoding data in the form of a frame or a packet. The encoding data and the AI data generated as a result of AI encoding may be transmitted through a homogeneous network or a heterogeneous network.

Figure 2:
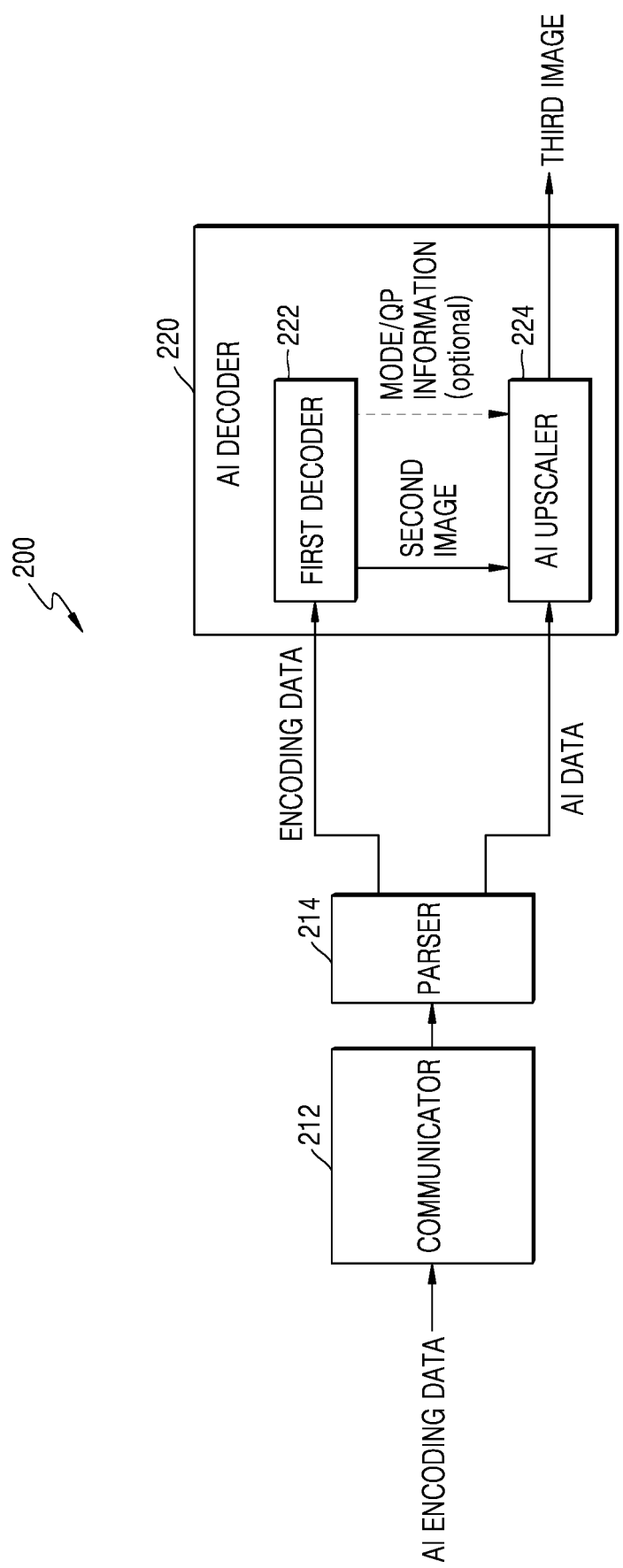
FIG. 2 is a block diagram illustrating an example configuration of an AI decoding apparatus according to an embodiment of the disclosure.

FIG. 2 is a block diagram illustrating an example configuration of an AI decoding apparatus 200 according to an embodiment of the disclosure.

Referring to FIG. 2, the AI decoding apparatus 200 according to an embodiment of the disclosure may include a communicator (e.g., including communication circuitry) 212, a parser (e.g., including parsing circuitry) 214, and an AI decoder (e.g., including processing circuitry and/or executable program elements) 220. The AI decoder 220 may include a first decoder 222 and an AI upscaler 224.

The communicator 212 may include various communication circuitry and receive AI encoding data generated as a result of AI encoding through a network. The AI encoding data generated as a result of AI encoding may include encoding data and AI data described above. The encoding data and the AI data may be received through a homogeneous network or a heterogeneous network.

The parser 214 may include various parsing circuitry and/or executable program elements and receive AI encoding data through the communicator 212 and parse and divide the AI encoding data into the encoding data and the AI data. For example, the parser 214 may read a header of data obtained from the communicator 212 to determine whether the data is the encoding data or the AI data. For example, the parser 214 may divide the data received through the communicator 212 into the encoding data and the AI data through the header of the data and transmit the encoding data and the AI data to the first decoder 222 and the AI upscaler 224, respectively.

In an embodiment of the disclosure, the AI encoding data parsed by the parser 214 may be obtained from a storage medium, and is not limited to that received through the communicator 212. For example, the AI encoding data may be obtained from a data storage medium including magnetic media such as a hard disk, a floppy disk and a magnetic tape, optical recording media such as a CD-ROM and a DVD, magneto-optical media such as a floptical disk, etc.

The first decoder 222 may reconstruct the second image 135 corresponding to the first image 115 based on the encoding data. The second image 135 generated by the first decoder 222 may be provided to the AI upscaler 224. According to an implementation example, first decoding related information such as mode information MODE INFORMATION (e.g., prediction mode information, motion information, etc.), quantization parameter information QP INFORMATION, etc. included in the encoding data may be further provided to the AI upscaler 224.

The AI upscaler 224 receiving the AI data may AI upscale the second image 135 based on the AI data. According to an implementation example, the AI upscaler 224 may AI upscale the second image 135 by further using the first decoding related information such as the mode information MODE INFORMATION, the quantization parameter information QP INFORMATION, etc. included in the encoding data.

The AI data provided to the AI upscaler 224 may include a plurality of pieces of information for enabling AI upscaling of the second image 135.

An example of the information included in the AI data may include at least one of difference information between resolution of the original image 105 and a resolution of the first image 115 or information related to the first image 115.

The difference information may be expressed as information (e.g., resolution conversion rate information) about a degree of resolution conversion of the first image 115 compared to the original image 105. In addition, because the resolution of the first image 115 is known through a resolution of the reconstructed second image 135 and the degree of resolution conversion may be confirmed through the resolution of the first image 115, the difference information may be expressed by the resolution information of the original image 105. In this regard, the resolution information may be expressed in the horizontal/vertical size of an image, or may be expressed in a ratio (16:9, 4:3, etc.) and size of one axis. In addition, when there is previously set resolution information, the resolution information may be expressed in the form of an index or a flag.

The information related to the first image 115 may include at least one of a bit rate of the encoding data generated as a result of first encoding of the first image 115, a codec type used in the first encoding of the first image 115 or on/off flag information of the AI upscaler 224.

The difference information and the information related to the first image 115 may be transmitted as one AI data or may be separately transmitted and processed as needed.

The AI upscaler 224 may determine an upscale target of the second image 135 based on at least one of the difference information or the information related to the first image 115 included in the AI data. The upscale target may indicate, for example, to what degree of resolution the second image 135 needs to be upscaled. When the upscale target is determined, the AI upscaler 224 may AI upscale the second image 135 using a neural network operation to generate a third image 145 corresponding to the upscale target.

In an embodiment of the disclosure, the communicator 212, the parser 214, and the AI decoder 220 are described as separate devices, but may be implemented through one processor. In this case, the communicator 212, the parser 214, and the AI decoder 220 may be implemented as a dedicated processor, or may be implemented through a combination of a general purpose processor such as an application processor (AP), a central processing unit (CPU), and a graphics processing unit (GPU) and software. In addition, the communicator 212, the parser 214, and the AI decoder 220 may be configured as one or more processors. In this case, the communicator 212, the parser 214, and the AI decoder 220 may be implemented as a combination of dedicated processors, or may be implemented through a combination of a plurality of general purpose processors such as an AP, a CPU, and a GPU and software. Similarly, the AI upscaler 224 and the first decoder 222 may be implemented through one processor or may be implemented in different processors.

Figure 3:
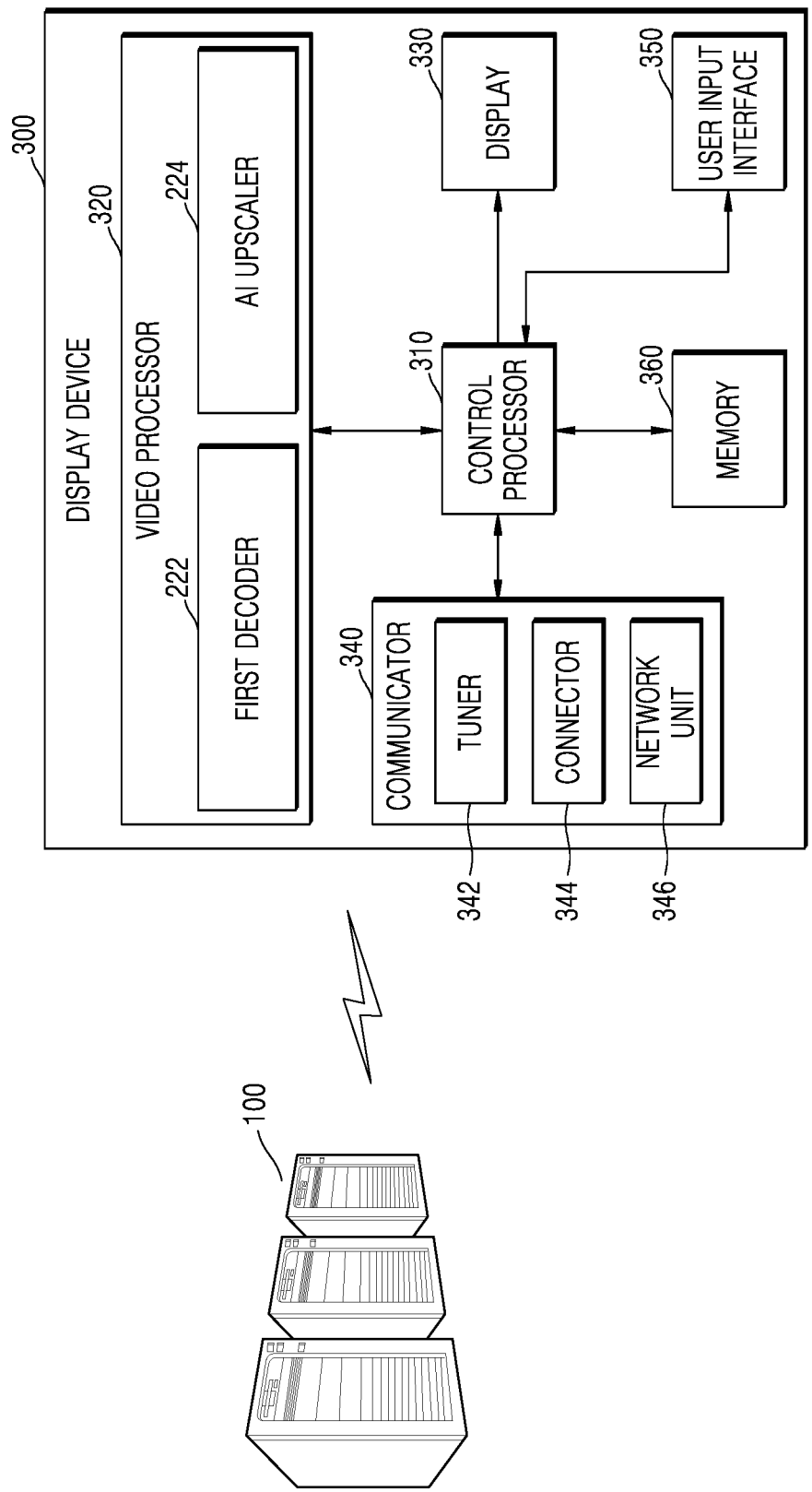
FIG. 3 is a block diagram illustrating an example configuration of a display device according to an embodiment of the disclosure.

FIG. 3 is a block diagram illustrating an example configuration of a display device 300 according to an embodiment of the disclosure.

According to an embodiment of the disclosure, the AI decoding apparatus 200 of FIG. 2 described above may be the display device 300 of FIG. 3. The display device 300 may receive an image from an image supply device 100. The image supply device 100 may include, for example, various servers such as a broadcasting station, a media service provider, a service company, a system integrator (SI) company, an application market, a web site, etc. Types of images supplied by the image supply device 100 may include, for example, broadcast content, media content, applications, etc. In an embodiment of the disclosure, the media content may be provided as a video stream in the form of a file according to real time streaming through a network in the form of a voice of demand (VOD) service.

The display device 300 may decode AI encoding data received from the image supply device 100 to display a reconstructed image. For example, the display device 300 may be a television (TV) that processes at least one of a broadcast signal, broadcast information, or broadcast data received from transmission equipment of a broadcast station.

The display device 300 may include a control processor (e.g., including processing circuitry) 310, a video processor (e.g., including video processing circuitry) 320, a display 330, a communicator (e.g., including communication circuitry) 340, a user input interface (e.g., including user input interface circuitry) 350, and a memory 360, but the configuration of the display device 300 is not limited to that shown.

The control processor 310 may include various processing circuitry and perform control for operating all the components of the display device 300. The control processor 310 may include at least one general purpose processor that loads at least a part of a control program from a nonvolatile memory in which the control program is installed into a volatile memory and executes the loaded control program. For example, the control processor 310 may be implemented, for example, and without limitation, as a CPU, an AP, a microprocessor, or the like. The control processor 310 may be mounted with one or more cores including a single core, dual cores, quad cores, or multiples thereof. The control processor 310 may include a plurality of processors. For example, the control processor 310 may include a main processor and a sub processor operating in a sleep mode (e.g., a mode in which only standby power is supplied to the display device 300 and the display device 300 does not operate as a display device).

The video processor 320 may include various video processing circuitry and perform various preset image processing operations on image data. The video processor 320 may output an output signal generated or combined by performing such image processing to the display 330 such that an image corresponding to the image data is displayed on the display 330.

The video processor 320 may include the first decoder 222 and the AI upscaler 224. The first decoder 222 and the AI upscaler 224 may correspond to the first decoder 222 and the AI upscaler 224 of FIG. 2, respectively.

In addition, the video processor 320 may include, for example, at least one module including circuitry and/or executable program elements for performing various image processing operations such as de-interlacing for changing an interlaced broadcast signal to a progressive broadcast signal, noise reduction for improving image quality, detail enhancement, frame refresh rate conversion, line scanning, or the like.

The video processor 320 may be implemented as a dedicated processor such as a GPU, or may be implemented through a combination of a general purpose processor such as a CPU or an AP and software. In addition, the first decoder 222 and the AI upscaler 224 may be implemented as different processors. When the AI upscaler 224 is implemented as the dedicated processor, the dedicated processor may be implemented to operate as an on-device based AI. Hereinafter, the dedicated processor that performs a function of the AI upscaler 224 is referred to as an AI processor. The configuration of the AI processor will be described in detail later with reference to FIG. 4.

The image signal processed by the video processor 320 may be output to the display 330. The display 330 may display an image corresponding to the image signal received from the video processor 320.

A method of implementing the display 330 is not limited and the display 330 may be implemented using various display methods such as, for example, and without limitation, liquid crystal, plasma, light-emitting diode, organic light-emitting diode, surface-conduction electron-emitter, carbon nano-tube, nano-crystal, etc. In an embodiment of the disclosure, the display 330 may include a display panel for displaying an image, and may further include an additional configuration, for example, a driver, according to the implementation method thereof.

The communicator 340 may include various communication circuitry and communicate with at least one external device using a wired or wireless communication method. The communicator 340 may be implemented as communication circuitry including a wired and/or wireless communication module (a software module, a chip, etc.) corresponding to a predetermined communication protocol. For example, the communicator 340 may include a tuner 342, a connector 344, and a network unit 346.

The communicator 340 may receive an image signal from the outside. For example, the communicator 340 may receive an image signal corresponding to the AI encoding data of FIG. 2. The specification of the received image signal may be configured in various ways corresponding to an implementation form of the display device 300.

For example, the communicator 340 may wirelessly receive an RF signal transmitted from a broadcasting station. In this example, the communicator 340 may include a tuner 342 for tuning a broadcast signal transmitted from the broadcasting station for each channel. The tuner 342 may include a demodulator for demodulating the tuned broadcast signal of a specific channel and outputting the demodulated broadcast signal as a signal in the form of a transport stream.

The tuner 342 and demodulator may be designed as an integrated single chip or two separate chips.

In addition, the communicator 340 may receive a signal based on a composite video, a component video, a super video, a SCART, a HDMI, a display port (DP) standard, etc. by wired. In this case, the communicator 340 may include the connector 344 for connecting the display device 300 to an external image source by wired. The connector 344 may be connected to the image source through, for example, an HDMI cable. For example, the display device 300 may receive an image signal related to content from the image source such as a set-top box through the connector 344. Although the connector 344 basically receives a signal from the image source, the connector 344 may be provided to transmit and receive the signal in both directions. For another example, the display device 300 may be connected to a mobile device as well as the set-top box by wired through the connector 344 to receive the image signal.

The communicator 340 may be connected to various peripheral devices to receive an image signal resulting from data received through a network such as the Internet. In this case, the communicator 340 may receive the image signal through the network unit 346. The network unit 346 may include various circuitry configured as one or a combination of two or more of a WLAN unit, a wireless communication module, and a wired communication module. The WLAN unit may wirelessly communicate with at least one external device through an access point (AP) under the control of the control processor 310. The WLAN unit may include a Wi-Fi communication module. The wireless communication module may directly perform wireless communication between the display device 300 and at least one external device wirelessly without an AP. A direct communication module may include a communication module such as Bluetooth, Bluetooth low energy, radio frequency (RF) communication, Wi-Fi Direct, Zigbee, Ultra Wideband (UWB), Near Field Communication (NFC), infrared data association (IrDA), etc. In addition, the communicator 340 may further include a wired communication module such as Ethernet.

The user input interface 350 may include various user input interface circuitry and receive a user input. The user input interface 350 may be installed in one area of the front, side, or rear of the display device 300 and implemented as a keypad (or an input panel) including a power key, a menu key, etc., a touch pad, a touch screen, a jog, a dial, a trackball, etc. to receive the user input. Alternatively, the user input interface 350 may further include a communication circuit for receiving command/data/information/signal from a remote control device (e.g., a remote controller, a mouse, a keyboard, a smart phone installed with an application capable of remotely controlling the display device 300, etc.) or a speech input interface for receiving speech spoken by a user and sound such as a microphone.

The memory 360 may be configured to store various pieces of data of the display device 300. For example, the memory 360 may be provided as a writable nonvolatile memory that retains data and reflects changes even when power supplied to the display device 300 is cut off. The memory 360 may include at least one of a hard disk (HDD), flash memory, EPROM, or EEPROM. For another example, the memory 360 may be provided as a volatile memory such as RAM. The volatile memory may include DRAM or SRAM which is faster in a read or write speed of the display device 300 than that of the nonvolatile memory. The data stored in the memory 360 may include, for example, an operating system for driving the display device 300, various applications executable on the operating system, image data, additional data, etc. In addition, the memory 360 may store input/output signals or data corresponding to an operation of each component under the control of the control processor 310. The memory 360 may store a program for controlling the display device 300, a UI related to an application provided by a manufacturer or downloaded from the outside, images for providing the UI, user information, documents, databases, or related data. Here, the application stored in the memory 360 may include a machine learning application or a deep learning application that operates based on previously performed training.

Figure 4:
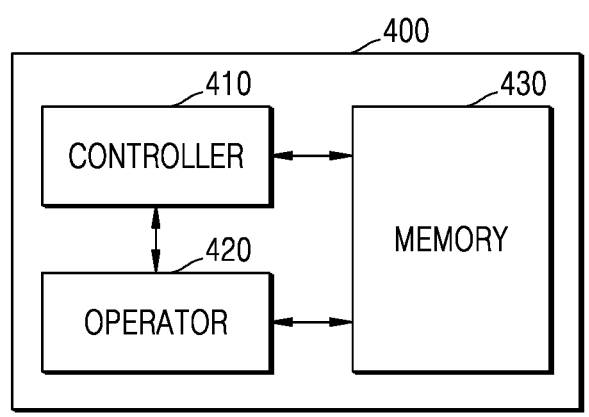
FIG. 4 is a block diagram illustrating an example configuration of an AI processor according to an embodiment of the disclosure.

FIG. 4 is a block diagram illustrating an example configuration of an AI processor 400 according to an embodiment of the disclosure.

FIG. 4 illustrates the AI processor 400 that performs a function of the AI upscaler 224 of FIG. 3 described above.

The AI processor 400 may be implemented, for example, and without limitation, as a general purpose processor, a digital signal processor (DSP), an application specific integrated circuit (ASIC), a field programmable gate array (FPGA), another programmable logic device (PLD), an individual gate or a transistor logic, an individual hardware component, a software module executed by a processor, or the like, or a combination thereof. According to an embodiment of the disclosure, the AI processor 400 may be implemented as a special purpose logic circuit in the form of a chipset, for example, a dedicated ASIC, a dedicated FPGA, a combination of a dedicated logic circuit and a general purpose processor, or the like, but is not limited to the implementation method described above.

The AI processor 400 may perform image processing on image data input by a neural network model. For example, the AI processor 400 may receive image data of the second image 135 and perform a neural network operation to output image data of the upscaled third image 145.

The AI processor 400 may include a controller (or a processor controller) 410, an operator 420, and a memory 430. The controller 410 may include various processing circuitry and serve to set a parameter required for an operation of the operator 420. The operator 420 may include various processing circuitry and/or executable program elements and perform the neural network operation based on the set parameter.

For example, different parameters may be required for the neural network operation for each image frame. The 'parameter' may include a plurality of weight values used in an operation process of each neural network layer. For example, the parameter may be expressed in the form of a matrix. The parameter is a value set as a result of training and may be updated through separate training data as necessary.

The controller 410 may be provided with a parameter identifier representative of the parameter including the plurality of weight values. The controller 410 may obtain the weight values included in the parameter based on the provided parameter identifier. For example, the controller 410 may obtain weight values based on the parameter identifier from the memory 360 outside the AI processor 400, or may obtain weight values based on the parameter identifier from the memory 430 of the AI processor 400. When the parameter is obtained, the controller 410 may register the obtained weight values in registers corresponding to the respective neural network operators included in the operator 420. For example, when one neural network operator performs convolution processing on image data using 3*3*8 filter kernels, 3*3*8 weight values may be registered in a register corresponding to the one neural network operator.

The operator 420 may include a plurality of neural network operators (e.g., including various processing circuitry and/or executable program elements), and may perform the neural network operation on the image data using at least some of the plurality of neural network operators under the control of the controller 410. For example, one neural network operator may perform convolution processing on the image data using a filter kernel to which the weight values registered in the register are applied. A process in which the operator 420 performs the neural network operation will be described in greater detail below with reference to FIG. 5.

The memory 430 may include a plurality of N line-memories. The N-line memory is a memory for temporarily storing image data in units of pixel columns (lines) in a horizontal direction of an image, and may be implemented as, for example, an SRAM. The N-line memory may be configured as one or more line memories to temporarily record the image data of one or more pixel columns.

The memory 430 may include the plurality of N-line memories respectively corresponding to the plurality of neural network operators included in the operator 420, and store at least one of an operation value necessary for the neural network operation of the plurality of neural network operators, an intermediate value of the operation, or a final value thereof.

The memory 430 may include N-line memories that receive the image data and distribute the image data to the plurality of neural network operators, or serve as a buffer for collecting the image data on which image processing is performed from the plurality of neural network operators.

In an embodiment of the disclosure, the controller 410 of the AI processor 400 may control input image data to be stored in the memory 430. In addition, the controller 410 may control some of the plurality of neural network operators to perform the neural network operation on image data split based on the size of the image and the data processing capabilities of the plurality of neural network operators and output upscaled image data.

In an embodiment of the disclosure, when only some of the plurality of neural network operators performs the neural network operation on the split image data, the controller 410 may deactivate some other neural network operators that do not perform the neural network operation on the split image data.

In an embodiment of the disclosure, the controller 410 may split the image data based on the horizontal size of the image and data processing units of the plurality of neural network operators.

In an embodiment of the disclosure, the controller 410 may control the plurality of neural network operators to perform the neural network operation on the image data split based on the size of the image and the number of the plurality of neural network operators and output the upscaled image data.

In an embodiment of the disclosure, the controller 410 may convert speed of clock frequencies of the plurality of neural network operators based on the size of the image.

In an embodiment of the disclosure, the controller 410 may determine whether to split the image data based on the data processing capabilities of the plurality of neural network operators or based on the number of the plurality of neural network operators, based on the estimated power consumption required for the neural network operation of the image data. Here, the data processing capabilities of the plurality of neural network operators represent a maximum data size that may be processed by each neural network operator for a predetermined clock.

In an embodiment of the disclosure, the controller 410 may obtain a parameter corresponding to a frame of an image and register the parameter in a register corresponding to each of the plurality of neural network operators.

In an embodiment of the disclosure, the controller 410 may apply different parameters for each frame of the image to perform the neural network operation on the image data.

Figure 5:
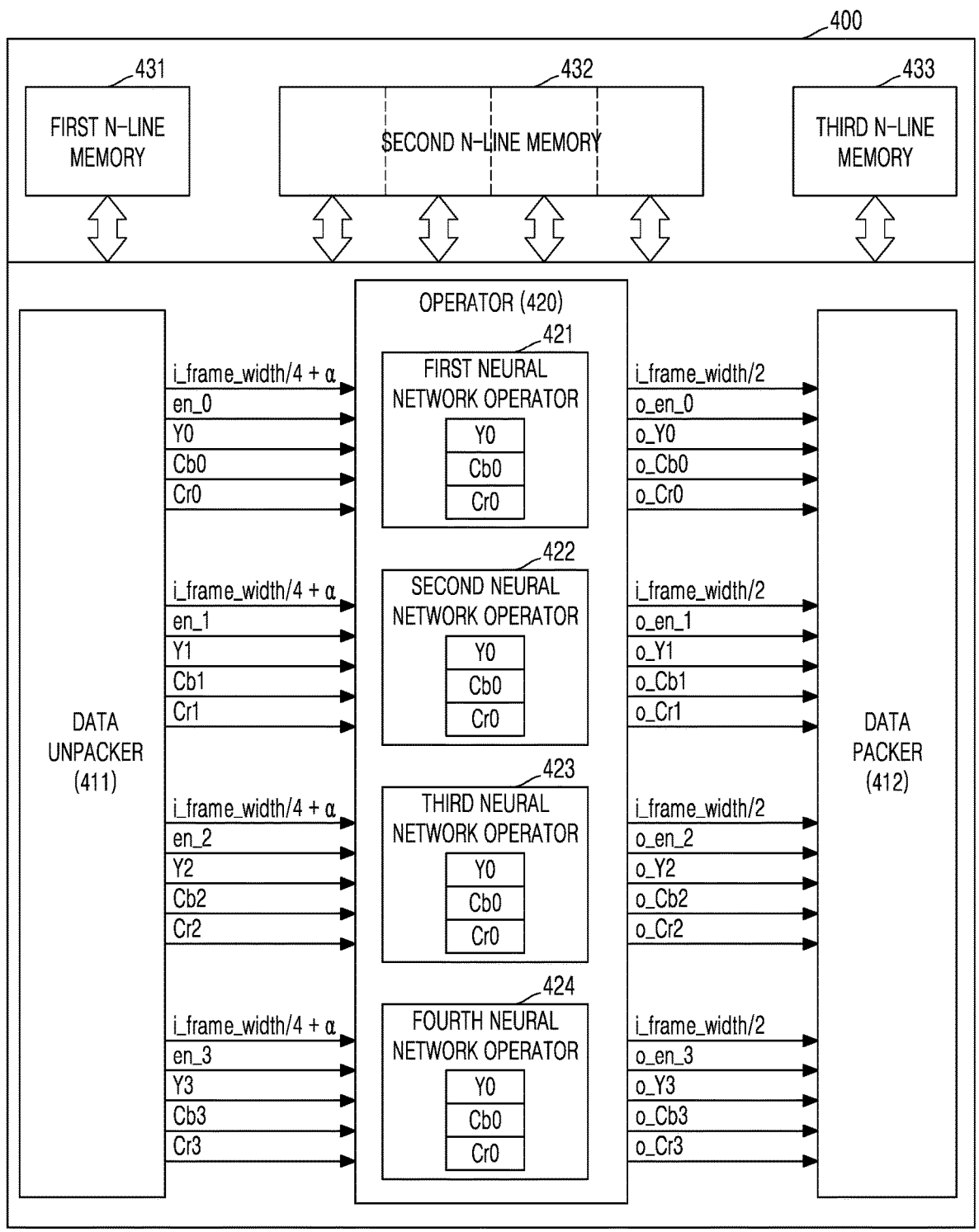
FIG. 5 is a block diagram illustrating an example configuration of an AI processor including a plurality of neural network operators, according to an embodiment of the disclosure.

FIG. 5 is a block diagram illustrating an example configuration of the AI processor 400 including a plurality of neural network operators (e.g., including processing circuitry and/or executable program elements) 421, 422, 423, and 424 according to an embodiment of the disclosure.

FIG. 5 is a part of the AI processor 400 and includes a configuration for the neural network operation on image data.

The AI processor 400 may include a data unpacker DATA_UNPACKER 411, the plurality of neural network operators 421, 422, 423, and 424, a data packer DATA_PACKER 412, and a plurality of N-line memories 431, 432 and 433. Here, the data unpacker 411 and the data packer 412 may be included in the controller 410 of FIG. 4, and the plurality of neural network operators 421, 422, 423, and 424 may be included in the operator 420 of FIG. 4.

In FIG. 5, the first N-line memory 431 may, for example, be a memory corresponding to the data unpacker 411. For example, the first N-line memory 431 may serve as a buffer for receiving image data according to a raster method from the outside and distributing the image data to the plurality of neural network operators 421, 422, 423, and 424. In this example, because the first N-line memory 431 provides image data necessary for the operation to the neural network operators 421, 422, 423, and 424 and simultaneously receives the image data from the outside, the first N-line memory 431 may have about twice the storage capacity of the input image data.

The second N-line memory 432 may, for example, include a plurality of N-line memories respectively corresponding to the plurality of neural network operators 421, 422, 423, and 424. The second N-line memory 432 may store at least one of an input value necessary for the neural network operation, an intermediate value of the operation, or a final value thereof.

The third N-line memory 433 may, for example, be a memory corresponding to the data packer 412 and may serve as a buffer for collecting operation results of the plurality of neural network operators 421, 422, 423, and 424 and outputting data to the outside. In this example, because the third N-line memory 433 collects the operation results from the neural network operators 421, 422, 423, and 424 and simultaneously provides image processed data to the outside, the third N-line memory 433 may have about twice the storage capacity of the output image data.

The first N-line memory 431, the second N-line memory 432, and the third N-line memory 433 may be allocated in the memory 430. The controller 410 may allocate storage spaces corresponding to the first N-line memory 431, the second N-line memory 432, and the third N-line memory 433 in the memory 430. The controller 410 may determine the size of the storage space of each of the first N-line memory 431, the second N-line memory 432, and the third N-line memory 433 based on the size of an input image or the size of split image data.

Upon describing a specific process in which the AI processor 400 may perform the neural network operation, first, when the image data is input, the data unpacker 411 may unpack the input image data to split the image data such that the split image data may be distributed to each of the plurality of neural network operators 421, 422, 423, and 424. The data unpacker 411 may provide each of a plurality of pieces of sub image data to each of the plurality of neural network operators 421, 422, 423, and 424 as the split image data (hereinafter, the split image data may be referred to as the plurality of pieces of sub image data). Each of the neural network operators 421, 422, 423, and 424 may perform image processing according to a neural network operation on the provided sub image data. The data packer 412 may collect results of image processing performed on each of the sub image data to output upscaled image data.

In an embodiment of the disclosure, the data unpacker 411 may read the image data corresponding to one line pixel and provide the read image data to the first N-line memory 431, to split and provide the image data to the plurality of neural network operators 421, 422, 423, and 424.

For example, when the input image is a 4K image, the data unpacker 411 may read image data corresponding to 3840*1 pixels and record the read image data onto the first N-line memory 431, to upscale the 3840*1 pixels that are one line of an image frame. The data unpacker 411 may split the image data corresponding to the 3840*1 pixels stored in the memory 430 based on the size of the image and the data processing capabilities of the plurality of neural network operators 421, 422, 423, and 424. For example, when the processing unit of each of the plurality of neural network operators 421, 422, 423 and 424 may be image data corresponding to 960*1 pixels, the data unpacker 411 may split the image data into four pieces of sub image data that are results of (3840)/(960) and provide each of the four pieces of sub image data to the second N-line memory 432 corresponding to each of the plurality of neural network operators 421, 422, 423, and 424.

In an embodiment of the disclosure, the data unpacker 411 may further obtain image data corresponding to a boundary region of the split image data in consideration of the size of a filter kernel used by the neural network operators 421, 422, 423, and 424 and provide the obtained image data to the second N-line memory 432 corresponding to each of the plurality of neural network operators 421, 422, 423, and 424.

Each of the plurality of neural network operators 421, 422, 423, and 424 may perform upscaling image processing on the sub image data stored in the second N-line memory 432. For example, one neural network operator may perform a convolution operation, a non-linear operation, and an upscale operation on provided sub image data. In addition, each of the plurality of neural network operators 421, 422, 423, and 424 may perform upscale image processing on each of Y, Cb, and Cr representing a pixel. For example, each of the plurality of neural network operators 421, 422, 423, and 424 may perform the convolution operation, the non-linear operation, and the upscale operation on a luma component Y, and may perform the upscale operation (e.g., bicubic scale) on chroma components Cb and Cr.

Figure 6:
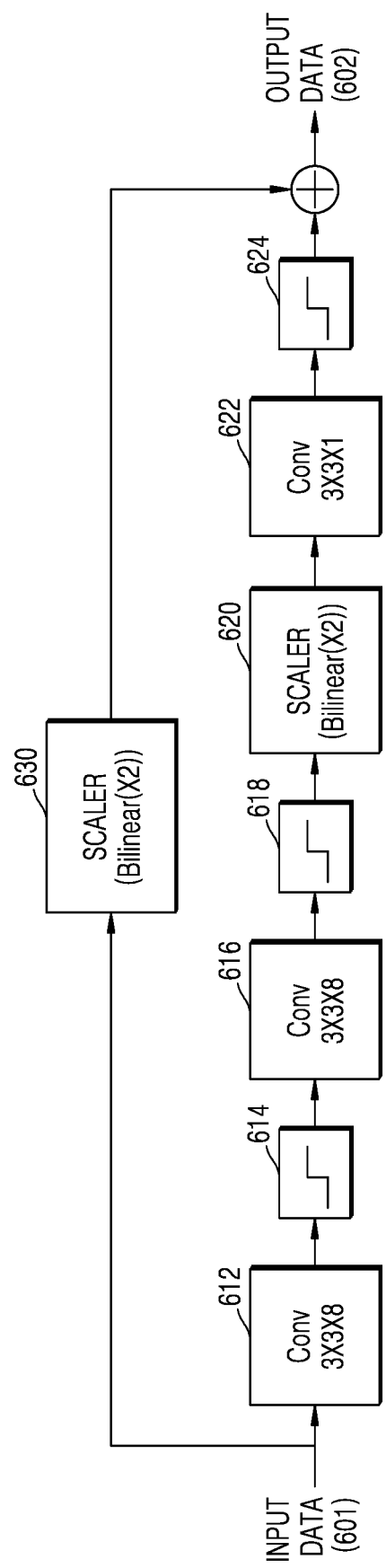
FIG. 6 is a diagram illustrating an example neural network operation according to an embodiment of the disclosure.

FIG. 6 is a diagram illustrating an example neural network operation according to an embodiment of the disclosure.

FIG. 6 illustrates an example of an operation of a neural network operator. Each of processing blocks (e.g., including processing circuitry and/or executable program elements) 612, 614, 616, 618, 620, 622, and 624 of FIG. 6 may correspond to at least one layer or at least one node of an artificial neural network model. Each of processing block 612, 614, 616, 618, 620, 622, and 624 may correspond to at least one of at least one register, a processor, or a memory allocated to the neural network operator or a combination thereof.

Referring to FIG. 6, a neural network operator may split input data 601 into connection data and inference data to perform a convolution operation, a nonlinear operations, and an upscale operation on the connection data, and perform the upscale operation on the inference data. The connection data may be data from connected training between AI for AI based AI downscaling and AI for AI based AI upscaling, and the inference data may be data that is not trained connectively.

The neural network operator may input the connection data of the sub image data 601 to the first convolution layer 612 to perform convolution processing. For example, the neural network operator may perform convolution processing on the sub image data using 8 filter kernels of a size of 3*3. The neural network operator may input 8 feature maps generated by the 8 filter kernels to the first activation layer 614 as a result of convolution processing.

The first activation layer 614 may give a non-linear characteristic to each feature map. The first activation layer 614 may include a sigmoid function, a tanh function, a rectified linear unit (ReLU) function, etc, but is not limited thereto. That the first activation layer 614 gives the non-linear characteristic may refer, for example, to changing and outputting some sample values of the feature map which are outputs through the first convolution layer 612. Changing may be performed by applying the non-linear characteristic.

The neural network operator may input an output of the first activation layer 614 to the second convolution layer 616. The neural network operator may perform convolution processing on the input data using the 8 filter kernels of the size of 3*3. An output of the second convolution layer 616 may be input to the second activation layer 618. The second activation layer 618 may give the non-linear characteristics to the input data.

The neural network operator may perform operation on an output of the second activation layer 618 by the scaler 620. The neural network operator may perform the scaler 620 on an output of at least one scale operation of a bilinear scale, a bicubic scale, a lanczos scale, or a stair step scale.

The neural network operator may input an output of the scaler 620 to the third convolution layer 622 to perform convolution processing for generating one output image using one filter kernel of a size of 3×3. An output of the third convolution layer 622 may be input to the third activation layer 624, and the third activation layer 624 may give the non-linear characteristic to the input data to obtain upscaled connection data.

In addition, the neural network operator may perform the operation on the inference data among the sub image data 601 by a scaler (e.g., including processing circuitry and/or executable program elements) 630 to obtain upscaled inference data. The neural network operator may perform the scaler 630 by at least one scale operation of the bilinear scale, the bicubic scale, the lanczos scale, or the stair step scale.

The neural network operator may combine the upscaled connection data and the upscaled inference data to obtain upscaled sub image data as output data 602.

In FIG. 6, one neural network model includes the three convolution layers 612, 614, and 622, the three activation layers 614, 618, and 624, and the scaler 620, but this is an example. The number of convolution layers and activation layers may vary according to an implementation example. In addition, according to an implementation example, the neural network operator may be implemented through not only a deep neural network (DNN) but also a recurrent neural network (RNN), buy the disclosure is not limited thereto.

The data packer 412 of FIG. 5 may collect upscaled sub image data from each of the plurality of neural network operators 421, 422, 423, and 424 and finally output the upscaled image data corresponding to the input image data. For example, the data packer 412 may output the upscaled image data corresponding to 3840*2 pixels as a result of upscaling 3840*1 pixels which is one line of the image frame.

Figure 7:
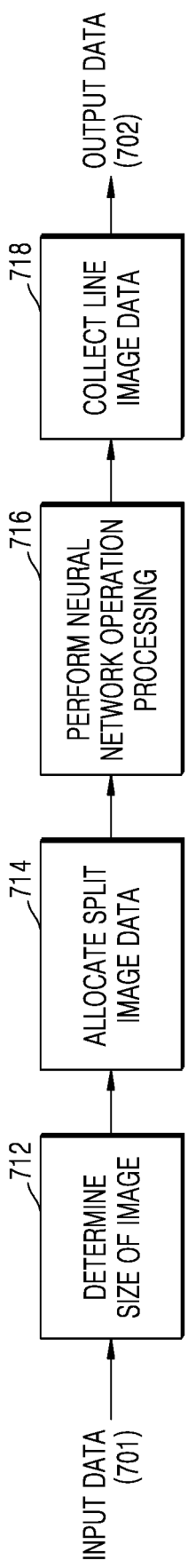
FIG. 7 is a diagram illustrating an example process of performing a neural network operation based on the size of an image, according to an embodiment of the disclosure.

FIG. 7 is a diagram illustrating an example process of performing a neural network operation based on the size of an image according to an embodiment of the disclosure.

As illustrated in FIG. 7, when image data of the input image is input as input data 701, the AI processor 400 may determine 712 the size of the input image. For example, the AI processor 400 may analyze the image data to determine the size of the image or receive information about the size of the image from the outside. In this case, the information about the size of the image may be included in AI data or encoding data described above with reference to FIG. 1 and transmitted. The size of the image may generally be the horizontal size of one frame, but is not limited to the above example, and may be resolution information of the image, ratio information of the image, or the vertical size of one frame.

When the size of the input image is determined, the AI processor 400 may split the image data to allocate 714 the split image data to a plurality of neural network operators based on the size of the image and the data processing capabilities of the plurality of neural network operators. Each of the plurality of neural network operators may perform neural network operation processing 716 on allocated sub image data.

The AI processor 400 may collect 718 image data in units of lines as a result of neural network operation by each of the plurality of neural network operators, and output upscaled image data as output data 702. For example, the AI processor 400 may merge the image data in units of lines output from the plurality of neural network operators and output the merged image data according to a sequential scanning method.

Each of processing blocks 712, 714, 716, and 718 in FIG. 7 may correspond to a software processing unit performed by at least one computer program command, and/or may correspond to a hardware resource (a processor, a register, a memory, etc.) allocated to a predetermined operation. According to an embodiment of the disclosure, operations of determining 712 the size of the image, allocating 714 the split image data, and collecting 718 the line image data may be performed by the controller 410, and neural network operation processing 716 may be performed through the plurality of neural network operators of the operator 420.

Figure 8:
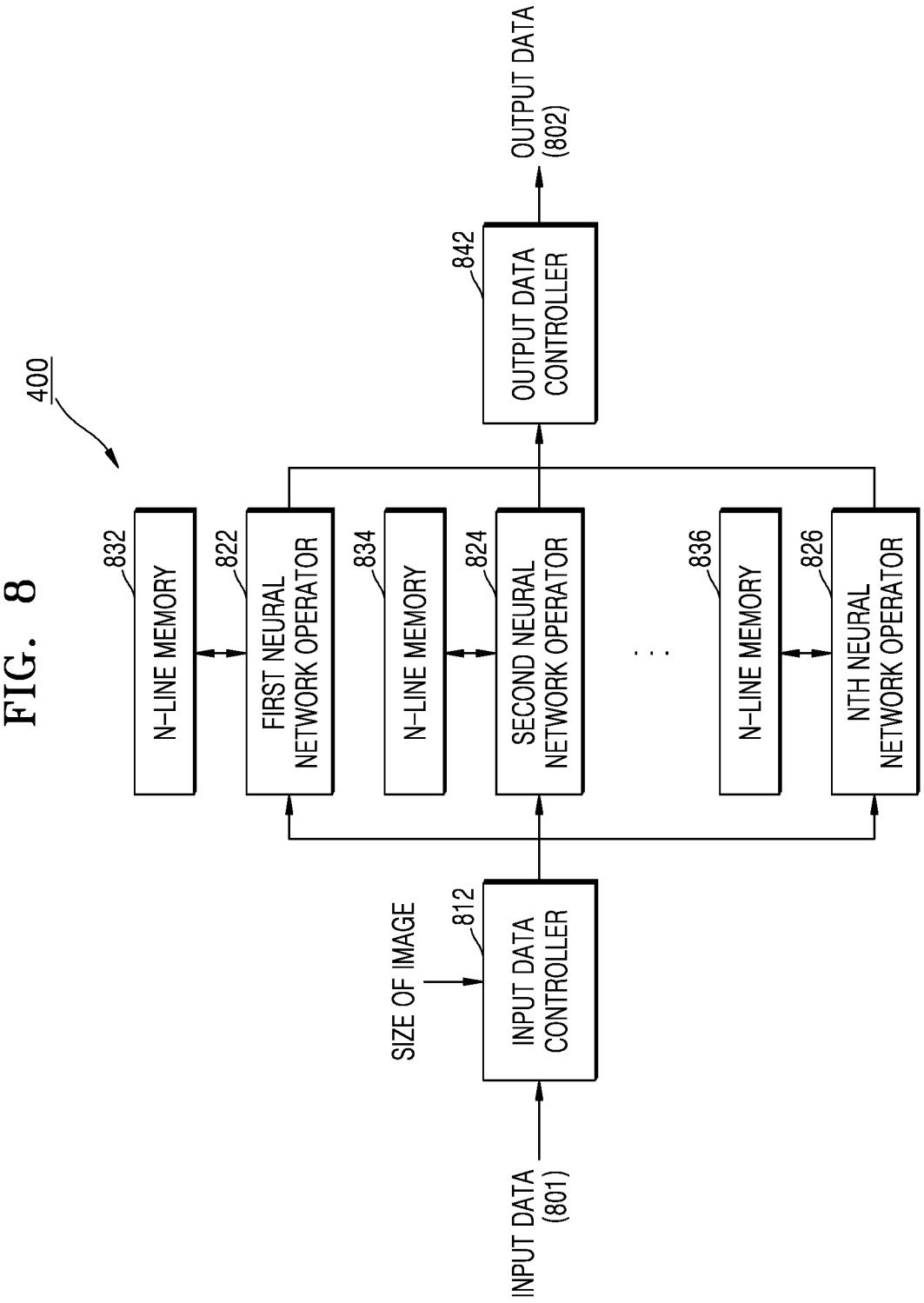
FIG. 8 is a block diagram illustrating an example AI processor for performing a neural network operation based on the size of an image, according to an embodiment of the disclosure.

FIG. 8 is a block diagram illustrating an example AI processor 400 for performing a neural network operation based on the size of an image according to an embodiment of the disclosure.

In FIG. 8, the AI processor 400 may include an input data controller (e.g., including control circuitry) 812, a plurality of neural network operators 822, 824 and 826, a plurality of N-line memories 832, 834 and 836 corresponding to the plurality of neural network operators 822, 824 and 826, respectively, and an output data controller (e.g., including control circuitry) 842. The input data controller 812 and the output data controller 842 may be included in the controller 410 of FIG. 4. In addition, the input data controller 812 may correspond to the data unpacker 411 of FIG. 5, and the output data controller 842 may correspond to the data packer 412 of FIG. 5.

The input data controller 812 may receive image data corresponding to pixels of the image and information about the size (e.g., the horizontal size of the image) of the image. For another example, the input data controller 812 may analyze the image data to determine the size of the image.

The input data controller 812 may split the image data and may simultaneously transmit at least some of each of sub image data that is the split image data to at least one of the neural network operators 822, 824, and 826, based on the size of the image and the data processing capabilities of the plurality of neural network operators 822, 824, and 826. The at least one neural network operator may perform the neural network operation on the provided image data and output a result of the operation.

According to an embodiment of the disclosure, the plurality of neural network operators 822, 824, and 826 may operate in parallel. Further, according to a resource allocated between the plurality of N-line memories 832, 834, and 836 and the plurality of neural network operators 822, 824, and 826, the split image data may be transmitted in series or in parallel between the plurality of N-line memories 832, 834, and 836 and the plurality of neural network operators 822, 824, and 826.

Figure 9:
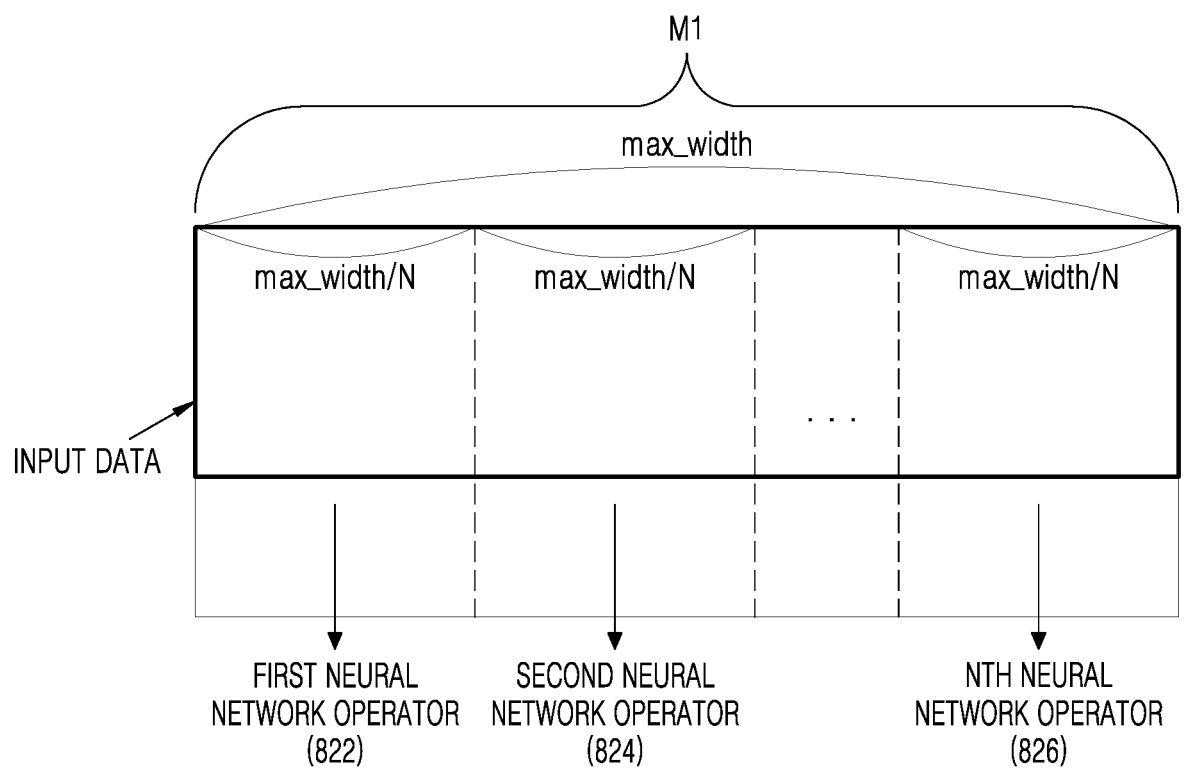
FIG. 9 is a diagram illustrating an example process in which a plurality of neural network operators process image data, according to an embodiment of the disclosure.
Figure 10:
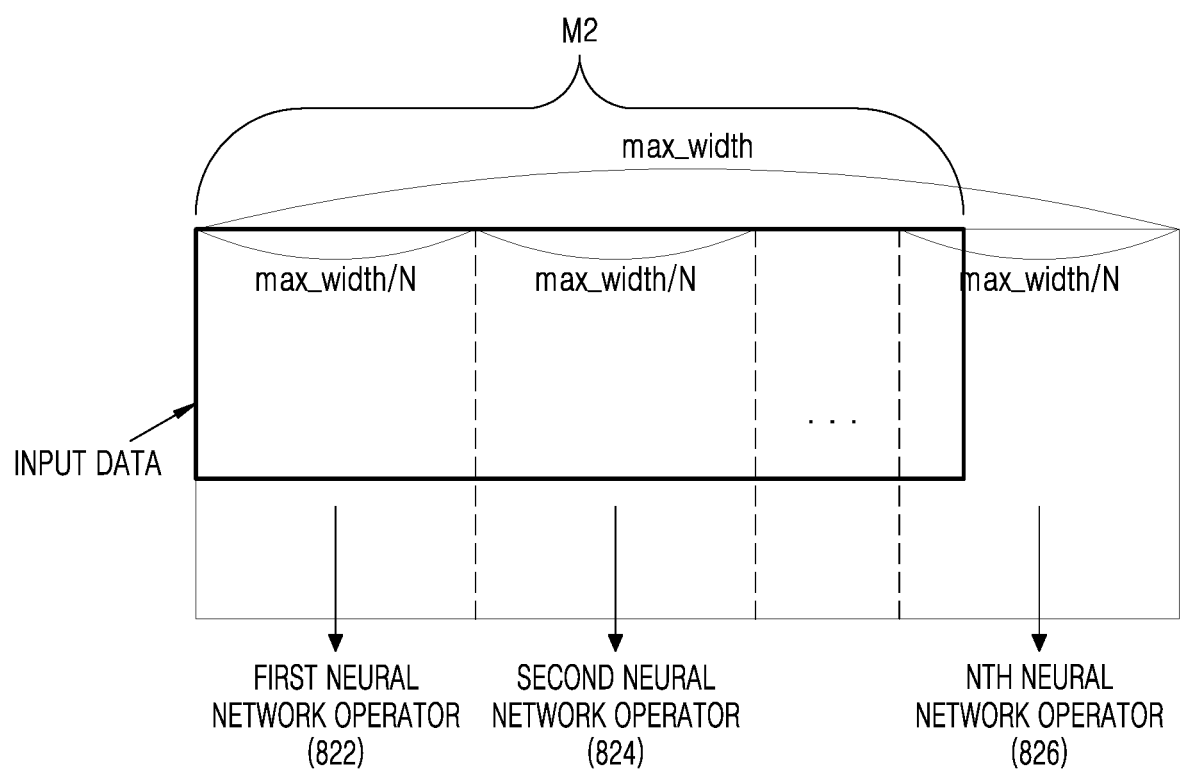
FIG. 10 is a diagram illustrating an example process in which a plurality of neural network operators process image data, according to another embodiment of the disclosure.
Figure 11:
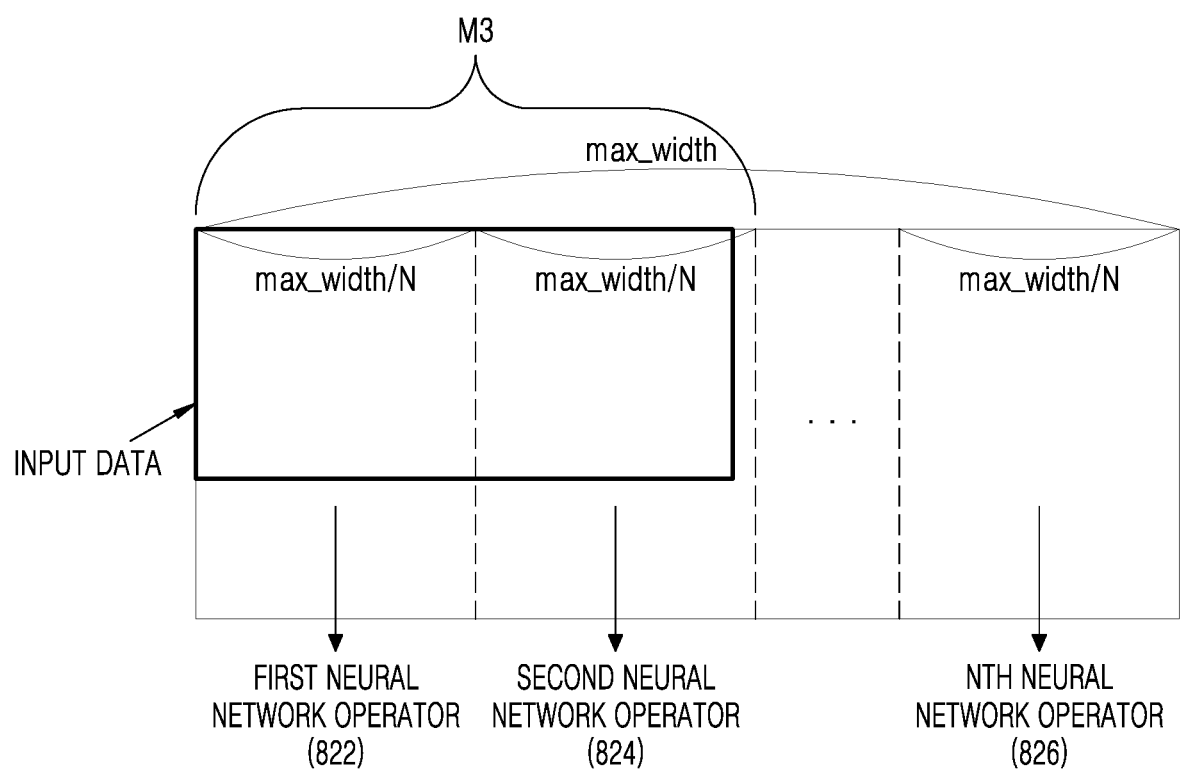
FIG. 11 is a diagram illustrating an example process in which a plurality of neural network operators process image data, according to another embodiment of the disclosure.

FIG. 9 is a diagram illustrating an example process in which the plurality of neural network operators 822, 824, and 826 process image data split according to the size of image data, according to an embodiment of the disclosure. In FIGS. 9, 10 and 11, it is assumed, for ease and convenience of explanation, that the AI processor 400 includes the plurality of N (N being a natural number) neural network operators 822, 824, and 826, a maximum processing unit of the plurality of neural network operators 822, 824, and 826 is max_width, and a processing unit of each of the plurality of neural network operators 822, 824, and 826 is max_width/N. The processing unit of each of the plurality of neural network operators 822, 824, and 826 may be defined, for example, as the number of pixels, the data size (bit, byte, etc.)

In this example, the input data controller 812 may split the input image data into the processing unit of each of the plurality of neural network operators 822, 824, and 826.

For example, in FIG. 9, the size of the image data of the input image may be M1, and the processing unit of the image data of the plurality of neural network operators 822, 824, and 826 may be max_width/N.

When the size M1 of the image data is equal to max_width which is the throughput of the entire neural network operators 822, 824, and 826 or has a multiple of the throughput, the input data controller 812 may split the image data into M1/max_width=N of the same size. The input data controller 812 may transmit the N split image data to each of the plurality of neural network operators 822, 824, and 826.

Each of the plurality of neural network operators 822, 824, and 826 may perform a neural network operation on the equally split image data. For example, an operation time length for each of the neural network operators 822, 824, and 826 to process the split image data may be the same, and each of the neural network operators 822, 824, and 826 may perform AI upscaling at the same time to output t upscaling image data.

FIG. 10 is a diagram illustrating an example process in which the plurality of neural network operators 822, 824, and 826 process image data split according to the size of image data, according to another embodiment of the disclosure. For another example, in FIG. 10, the size of the image data may be M2, and the processing unit of the image data of the plurality of neural network operators 822, 824, and 826 may be max_width/N.

When the size M2 of the image data is smaller than max_width which is the image data throughput of the entire neural network operators 822, 824, and 826, but greater than (max_width/N)*(N−1), the input data controller 812 may split the image data into N pieces. The size of N-th image data may be smaller than the size of other image data. Accordingly, the operation time of the N-th neural network operator 826 that processes the N-th image data may be shorter than that of the other neural network operators 822 and 824. In this example, the N-th neural network operator 826 that processes the N-th image data may first process the image data allocated to the N-th neural network operator 826 and wait while the other neural network operators 822 and 824 process the image data or perform other operations during idle time after processing of the image data.

FIG. 11 is a diagram illustrating an example process in which the plurality of neural network operators 822, 824, and 826 process image data split according to the size of image data, according to another embodiment of the disclosure. For another example, in FIG. 11, the size of the image data may be M3, and the processing unit of the image data of the plurality of neural network operators 822, 824, and 826 may be max_width/N. In this example, the size M3 of the image data may be smaller than the image data processing unit of some neural network operators 822, 824 among the plurality of neural network operators 822, 824, and 826. The input data controller 812 may split the image data into image data processing units so as to process the image data using only the minimum number of neural network operators. For example, in FIG. 11, the input data controller 812 may split the image data into two pieces so as to use only some neural network operators 822 and 824.

In FIG. 11, the input data controller 812 may deactivate the N-th neural network operator 826 that does not perform neural network operation processing on the image data among the plurality of neural network operators 822, 824, and 826. Deactivating the neural network operator may include turning off the neural network operator such that power is not applied, not applying an activation signal (an enable signal, a trigger signal, etc.), not applying a clock frequency, or converting the neural network operator into a standby state or sleep mode. When the neural network operator that does not process the image data is deactivated, power consumption of the AI processor 400 may be greatly reduced.

Referring back to FIG. 8, when the neural network operation is performed by at least one of the plurality of neural network operators 822, 824, and 826, the output data controller 842 may collect upscaled split data that are results of operation from each neural network operator that performs the neural network operation. When the upscaled split data are collected, the output data controller 842 may output the upscaled image data as the output data 802.

In another embodiment of the disclosure, the input data controller 812 may split the image data based on the size of the image and the number of the neural network operators 822, 824, and 826. The input data controller 812 may transmit each of sub image data which is the split image data to each of the plurality of neural network operators 822, 824, and 826. For example, when the size of the image data of the input image is M4 and the number of the neural network operators 822, 824, and 826 is N, the input data controller 812 may split the image data of the input image into N sub-image data of the same size of M4/N. The input data controller 812 may respectively transmit the N split image data to the plurality of neural network operators 822, 824, and 826. Each of the plurality of neural network operators 822, 824, and 826 may perform the neural network operation on the image data of the same size. Each of the plurality of neural network operators 822, 824, and 826 may perform AI upscaling processing on the split image data to output upscaling image data.

In another embodiment of the disclosure, the AI processor 400 may operate based on a clock frequency that is an operating speed of the AI processor 400. The AI processor 400 may commonly use a specific clock frequency with respect to each module constituting the AI processor 400 or may use a different clock frequency for each module. The clock frequency may be, for example, one or more values between 100 MHz and 800 MHz, but is not limited to the above-described range.

In this case, the AI processor 400 may convert speed of clock frequencies of the plurality of neural network operators 822, 824, and 826 based on the size of the image. For example, when the size of the image is small, the plurality of neural network operators 822, 824, and 826 may perform the neural network operation using a clock frequency of a low speed. When the size of the image is large, the neural network operators 822, 824, and 826 may perform the neural network operation using a clock frequency of a high speed. According to the embodiment of the disclosure, the AI processor 400 may adjust the clock frequencies of the neural network operators 822, 824, and 826 according to the size of the input image, thereby reducing power consumption when the size of the input image is small.

In another embodiment of the disclosure, the AI processor 400 may determine whether to split the image data based on the data processing capabilities of the plurality of neural network operators 822, 824, and 826 or based on the number of the plurality of neural network operators 822, 824, and 826, based on an amount of expected power consumption required for the neural network operation of the image data. For example, the power consumed by the neural network operators 822, 824, and 826 may include dynamic power consumed when the clock frequency is applied and static power consumed when the clock frequency is not applied. The static power may refer to leakage power that leaks because the AI processor 400 serves as a capacitance even when the clock frequency is not applied.

In this example, the AI processor 400 may predict which policy is more effective for power consumption between a policy that reduces the static power itself by turning off some neural network operators in a situation where the image data is processed based on the size of the image data of the input image and the data processing capabilities of the plurality of neural network operators 822, 824, and 826 and a policy that reduces the dynamic power by changing the clock frequency in a situation where the image data is processed based on the size of the image data and the number of the plurality of neural network operators 822, 824, and 826. For example, the AI processor 400 may select the policy that turns off some neural network operators when contribution of the static power is high in the power consumption, and select the policy that reduces the dynamic power by changing the clock frequency when the contribution of the static power is low. For another example, the AI processor 400 may select the policy that turns off some neural network operators when the size of the image data of the input image is less than or equal to a predetermined size, and select the policy that changes the clock frequency when the size of the image data exceeds the predetermined size. The AI processor 400 may determine a policy based on at least one of the clock frequency, a voltage, a current, the size of a chip cell, or a characteristic of the chip cell, and when the policy effective for power consumption is determined, may perform the neural network operation on the image data using at least one of the plurality of neural network operators 822, 824, and 826 according to the determined policy.

FIG. 12 is a flowchart illustrating an example method, performed by the AI processor 400, of performing a neural network operation according to an embodiment of the disclosure.

Each operation of the method of performing the neural network operation of the disclosure may be performed by various types of electronic devices including, for example, a processor and a memory and using an artificial neural network model. An embodiment of the disclosure in which a device including the AI processor 400 according to embodiments of the disclosure performs the method of performing the neural network operation will be described here. Accordingly, the embodiments of the disclosure described with respect to the AI processor 400 may be applicable to embodiments of the disclosure of the method of performing the neural network operation, and conversely, the embodiments of the disclosure described with respect to the method of performing the neural network operation may be applicable to the embodiments of the disclosure of the AI processor 400. The method of performing the neural network operation according to the embodiments of the disclosure is not limited to an embodiment of the disclosure in which the method is performed by the AI processor 400 disclosed herein, and may be performed by various types of electronic devices.

In operation 1201 of FIG. 12, the AI processor 400 may receive image data of an input image and store the image data in at least one memory.

In operation 1203 of FIG. 12, the AI processor 400 may split the image data stored in the memory based on the size of the image and the data processing capabilities of a plurality of neural network operators. For example, the AI processor 400 may split the image data based on the horizontal size of the image and data processing units of the plurality of neural network operators.

In operation 1205 of FIG. 12, the AI processor 400 may perform the neural network operation on the split image data through at least some of the plurality of neural network operators. According to an embodiment of the disclosure, the AI processor 400 may use some or all of the plurality of neural network operators. In addition, the AI processor 400 may adjust the number of the used neural network operators according to an embodiment of the disclosure. In this case, the AI processor 400 may deactivate some other neural network operators that do not perform neural network operation processing on the split image data among the plurality of neural network operators.

In operation 1207 of FIG. 12, the AI processor 400 may output upscaled image data as a result of performing the neural network operation through some neural network operators.

In another embodiment of the disclosure, the AI processor 400 may split the image data based on the size of the image and the number of the neural network operators. The AI processor 400 may perform the neural network operation on the split image data through the plurality of neural network operators. In this case, the AI processor 400 may convert the speed of clock frequencies of the plurality of neural network operators based on the size of the image.

In another embodiment of the disclosure, the AI processor 400 may determine whether to split the image data based on the data processing capabilities of the plurality of neural network operators or based on the number of the plurality of neural network operators, based on an amount of expected power consumption required for the neural network operation of the image data.

The various example embodiments of the disclosure described above may be written as a program or an instruction executable on a computer, and the program or the instruction may be stored in a medium.

The media may continuously store a non-transitory computer-executable program or instruction or temporarily store the non-transitory computer-executable program or instruction for execution or downloading. In addition, the medium may include a variety of recording means or storage means in the form of single hardware or a combination of several hardware and not limited to a medium directly connected to any computer system but may be distributed on a network. Examples of the medium may include a magnetic medium such as hard disk, floppy disk and magnetic tape, an optical recording medium such as CD-ROM and DVD, a magneto-optical medium such as floptical disk, ROM, RAM, flash memory, etc. and be configured to store program instructions. In addition, other examples of the medium may include a recording medium or a storage medium managed by an app store that distributes an application, a site that supplies or distributes various software, a server, etc.

The neural network model described above may be implemented as a software module. When the neural network model is implemented as the software module (e.g., a program module including instructions), a DNN model may be stored on a non-transitory computer readable recording medium. In addition, the neural network model may be integrated in the form of a hardware chip to be a part of the AI decoding apparatus 200 or the display device 300 described above. For example, the neural network model may be manufactured in the form of a dedicated hardware chip for AI, or as part of an existing general purpose processor (e.g., a CPU or an application processor) or a graphics dedicated processor (e.g., a GPU).

In addition, the neural network model may be provided in the form of downloadable software. A computer program product may include a product (e.g., a downloadable application) in the form of a software program distributed electronically through a manufacturer or an electronic market. For electronic distribution, at least a part of the software program may be stored on a storage medium or temporarily generated. In this case, the storage medium may be a server of the manufacturer or the electronic market, or a storage medium of a relay server.

An AI processor according to embodiments of the disclosure may perform a neural network operation on image data using some of a plurality of neural network operators according to the size of an image, thereby reducing power consumption required for the neural network operation of the AI processor.

In addition, the AI processor according to embodiments of the disclosure may convert clock frequencies of the plurality of neural network operators according to the size of the image, thereby reducing power consumption required for the neural network operation of the AI processor.

In addition, the AI processor according to embodiments of the disclosure may adaptively operate the plurality of neural network operators for 8K, 4K, 2K, etc., other than an image of a predetermined size, and thus a neural network operation platform may be recycled with respect to various sizes of the image.

The effect that the AI processor according to an embodiment of the disclosure may achieve is not limited to those mentioned above, and other effects that are not mentioned above may be apparently understood by those skilled in the art from the following description.

While the disclosure has been illustrated and described with reference to various example embodiments, it will be understood that the various example embodiments are intended to be illustrative, not limiting. One of ordinary skill in the art will understand that various changes in form and detail may be made without departing from the true spirit and full scope of the disclosure, including the appended claims and their equivalents.

What is claimed is:

1. An artificial intelligence (AI) processor comprising:
at least one memory;
a plurality of neural network operators comprising circuitry configured to process an image; and
a controller configured to control the at least one memory and the plurality of neural network operators,
wherein the controller is further configured to:
obtain a plurality pieces of sub image data from image data by splitting the image data stored in the at least one memory to the plurality pieces of sub image data based on a size of an image corresponding to the image data and data processing capabilities of each of the plurality of neural network operators;
control the plurality of neural network operators to perform a neural network operation on the plurality pieces of sub image data to generate upscaled image data including a plurality of upscaled pieces of sub image data generated by respective neural network operators of the plurality of neural network operators; and
output the upscaled image data.

2. The AI processor of claim 1, wherein the controller is further configured to deactivate neural network operators of the plurality of neural network operators that do not perform a neural network operation processing on the plurality pieces of sub image data.

3. The AI processor of claim 1, wherein the controller is further configured to split the image data based on a horizontal size of the image and a unit of data processing of the plurality of neural network operators.

4. The AI processor of claim 1, wherein the at least one memory comprises a plurality of N-line memories respectively corresponding to the plurality of neural network operators,
wherein the plurality of N-line memories comprise at least one of an operation value required for the neural network operation of the plurality of neural network operators, an intermediate value of the neural network operation, or a final value.

5. The AI processor of claim 1, wherein the image data is split based on a number of the plurality of neural network operators.

6. The AI processor of claim 1, wherein the controller is further configured to, based on the size of the image, convert a speed of clock frequencies of the plurality of neural network operators.

7. The AI processor of claim 1, wherein the controller is further configured to determine whether to split the image data based on the data processing capabilities of the plurality of neural network operators, based on a number of the plurality of neural network operators, or based on an amount of expected power consumption required for the neural network operation performed on the image data.

8. The AI processor of claim 1, wherein the plurality of neural network operators are configured to perform a convolution neural network operation, a non-linear operation, and an upscaler operation.

9. The AI processor of claim 1, wherein the image data comprises connection data from connected training between AI for AI downscaling and AI for AI upscaling.

10. The AI processor of claim 1, wherein the controller is further configured to obtain a parameter corresponding to a frame of the image and register the parameter in a register corresponding to each of the plurality of neural network operators.

11. The AI processor of claim 1, wherein the plurality of neural network operators are configured to apply different parameters for each frame of the image to perform the neural network operation on the image data.

12. The AI processor of claim 1, wherein the image data, based on the image being a frame, comprises image data corresponding to pixels of one line of the frame.

13. A method, performed by an AI processor, of performing a neural network operation, the method comprising:
receiving image data of an image and storing the image data in at least one memory;
obtaining a plurality pieces of sub image data from image data by splitting the image data stored in the at least one memory to the plurality pieces of sub image data based on a size of an image corresponding to the image data and data processing capabilities of each of a plurality of neural network operators splitting the image data stored in the at least one memory based on a size of the image and data processing capabilities of a plurality of neural network operators;
performing, through a plurality of neural network operators, the neural network operation on the plurality pieces of sub image data to generate upscaled image data including a plurality of upscaled pieces of sub image data generated by respective neural network operators of the plurality of neural network operators; and
outputting the upscaled image data.

14. The method of claim 13, further comprising, deactivating neural network operators of the plurality of neural network operators that do not perform neural network operation processing on the plurality pieces of sub image data.

15. The method of claim 13, wherein the splitting of the image data stored in the at least one memory comprises splitting the image data based on a horizontal size of the image and a unit of data processing of the plurality of neural network operators.

16. The method of claim 13, wherein
the image data is split based on a number of the plurality of neural network operators.

17. The method of claim 13, further comprising, based on the size of the image, converting a speed of clock frequencies of the plurality of neural network operators.

18. The method of claim 13, further comprising determining whether to split the image data based on the data processing capabilities of the plurality of neural network operators, based on a number of the plurality of neural network operators, or based on an amount of expected power consumption required for the neural network operation performed on the image data.

19. The method of claim 13, wherein the plurality of neural network operators are configured to perform a convolution neural network operation, a non-linear operation, and an upscaler operation.

20. The method of claim 13, wherein the image data comprises connection data from connected training between AI for AI downscaling and AI for AI upscaling.

* * * * *